US006634769B2

(12) United States Patent
Beasley, Jr.

(10) Patent No.: US 6,634,769 B2
(45) Date of Patent: Oct. 21, 2003

(54) TIMER

(75) Inventor: Robert E. Beasley, Jr., Germantown, TN (US)

(73) Assignee: Hunter Fan Company, Memphis, TN (US)

( * ) Notice: Subject to any disclaimer, the term of this patent is extended or adjusted under 35 U.S.C. 154(b) by 0 days.

(21) Appl. No.: 09/917,009

(22) Filed: Jul. 30, 2001

(65) Prior Publication Data

US 2003/0021118 A1 Jan. 30, 2003

(51) Int. Cl.[7] ................................................ F21V 33/00
(52) U.S. Cl. ......................................... 362/276; 362/387
(58) Field of Search .......................... 362/95, 253, 276, 362/258, 387, 410, 411, 801; 368/110, 12

(56) References Cited

U.S. PATENT DOCUMENTS 3,188,752 A * 6/1965 Skinner ...................... 362/294
5,212,672 A * 5/1993 Loisch et al. ................. 368/79
5,442,524 A * 8/1995 Farmer ........................ 362/284

\* cited by examiner

*Primary Examiner*—Y. My Quach-Lee
(74) *Attorney, Agent, or Firm*—Baker Donelson

(57) ABSTRACT

A timer (10) is provided having a housing (11) sized and shaped to support a conventional lamp thereon. The timer (10) also has a storage chamber (16) extending from the peripheral side wall (14) and an electric circuit (21). The electric circuit (21) includes a conventional electric power cord (22) terminating at a male plug (23), a female electric plug receptacle (25) positioned to be accessed through the storage chamber (16), and a controller (26) which controls the electric current passing from the power cord (22) to the female receptacle (25). This construction allows a lamp to be placed directly upon the timer (10) to enable easy access to the power controlling timer (10).

13 Claims, 2 Drawing Sheets

TIMER

TECHNICAL FIELD

This invention relates to timers which control electric power being supplied to an electrical appliance, and specifically to timers used in conjunction with electric lamps.

BACKGROUND OF THE INVENTION

Timers which may be coupled to lamps or other electric appliances have existed for many years. Typically, these timers are utilized to activate a lamp in the absence of a homeowner in order to give the appearance that the home is occupied. These devices may also be used by a homeowner who does not wish to enter a darkened home, and therefore the timer is set to turn on a lamp prior to the time the homeowner typically arrives.

These timers include a small housing, pair of male, electric prongs extending from the housing which are adapted to be received within a conventional electric wall socket, and a pair of female receptacles extending into the housing which are adapted to receive the male prongs of the lamp plug. However, because these timers are mounted directly to and suspended from the wall electric socket or receptacle their access is not always convenient. Homeowners oftentimes must move furniture or get on their hands and knees in order to reach behind and beneath the furniture to plug the timers into the wall receptacle, to plug the appliance into the timers, or to initiate the timers' operation.

Another problem associated with these timers is that there mounting upon the wall makes them very pronounced and aesthetically undesirable. In addition to this purely aesthetic problem this fact creates a second problem as homeowners move items, such as furniture, in front of the timer so as to hide them from view. This movement of furniture to cover the timer however exacerbates the previous problem of accessing the timer.

Accordingly, it is seen that a need remains for a timer which is easily accessible but yet is aesthetically unobtrusive. It is to the provision of such therefore that the present invention is primarily directed.

SUMMARY OF THE INVENTION

In a preferred form of the invention a timer to be used with a lamp comprises a housing having a floor, a top wall sized and shaped to receive a lamp thereon, and side walls extending between the floor and the top wall. The housing is adapted to support a lamp positioned upon the top wall. The timer also includes an electric cord extending from the housing having a male plug configured to be received in a conventional electric receptacle, a female electric receptacle extending into the housing configured to receive the male plug of a lamp, and programmable control means for automatically energizing at preselected time intervals the female electric receptacle with an electric current passing through the electric cord.

DETAILED DESCRIPTION

Figure 1:
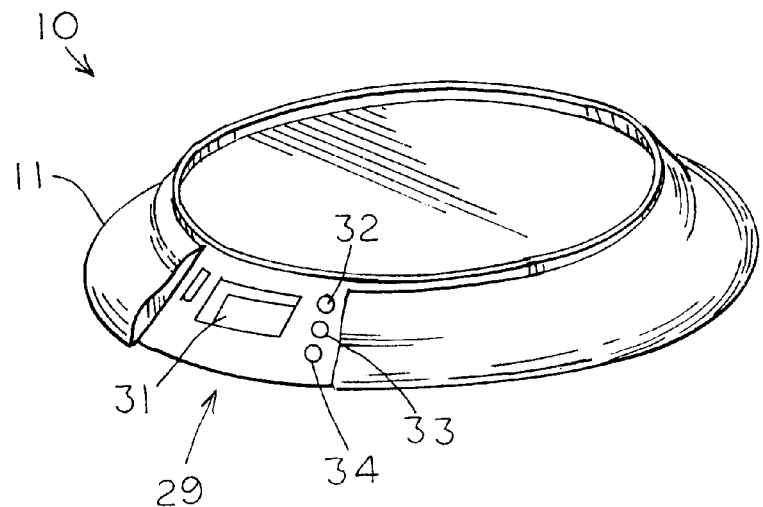
FIG. 1 is a perspective view of a timer embodying principles of the invention in a preferred form.
Figure 2:
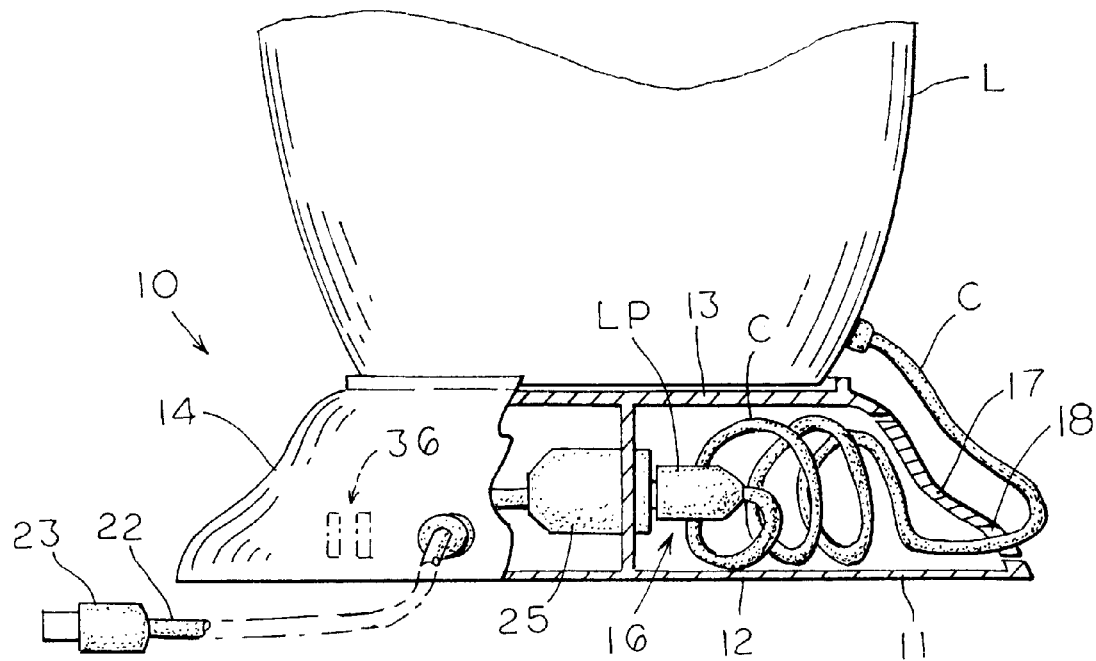
FIG. 2 is a side view of the timer of FIG. 1 shown in partial cross-section.

With reference next to the drawings, there is shown a timer 10 in a preferred form of the invention. The timer 10 is in the form of a portable, self-standing unit adapted to be set upon a table or other piece of furniture. The timer 10 has a housing 11 adapted to support the weight of a conventional lamp L. The housing 11 includes a floor or bottom wall 12, a top wall 13 sized and shaped to receive the base of the lamp L thereon, and a generally annular side wall 14 extending between the bottom wall 12 and the top wall 13. The housing 11 includes a storage chamber 16 extending from the side wall 14 into the interior space of the housing. The storage chamber 16 may include a movable door 17 configured to conform with the side wall 14. The door 17 has a slot 18 therein sized and shaped to receive the cord of the lamp L. The housing 11 may be shaped and colored to match a number of conventional lamps so as to minimize the conspicuousness of the timer while providing an aesthetically pleasing appearance.

Figure 3:
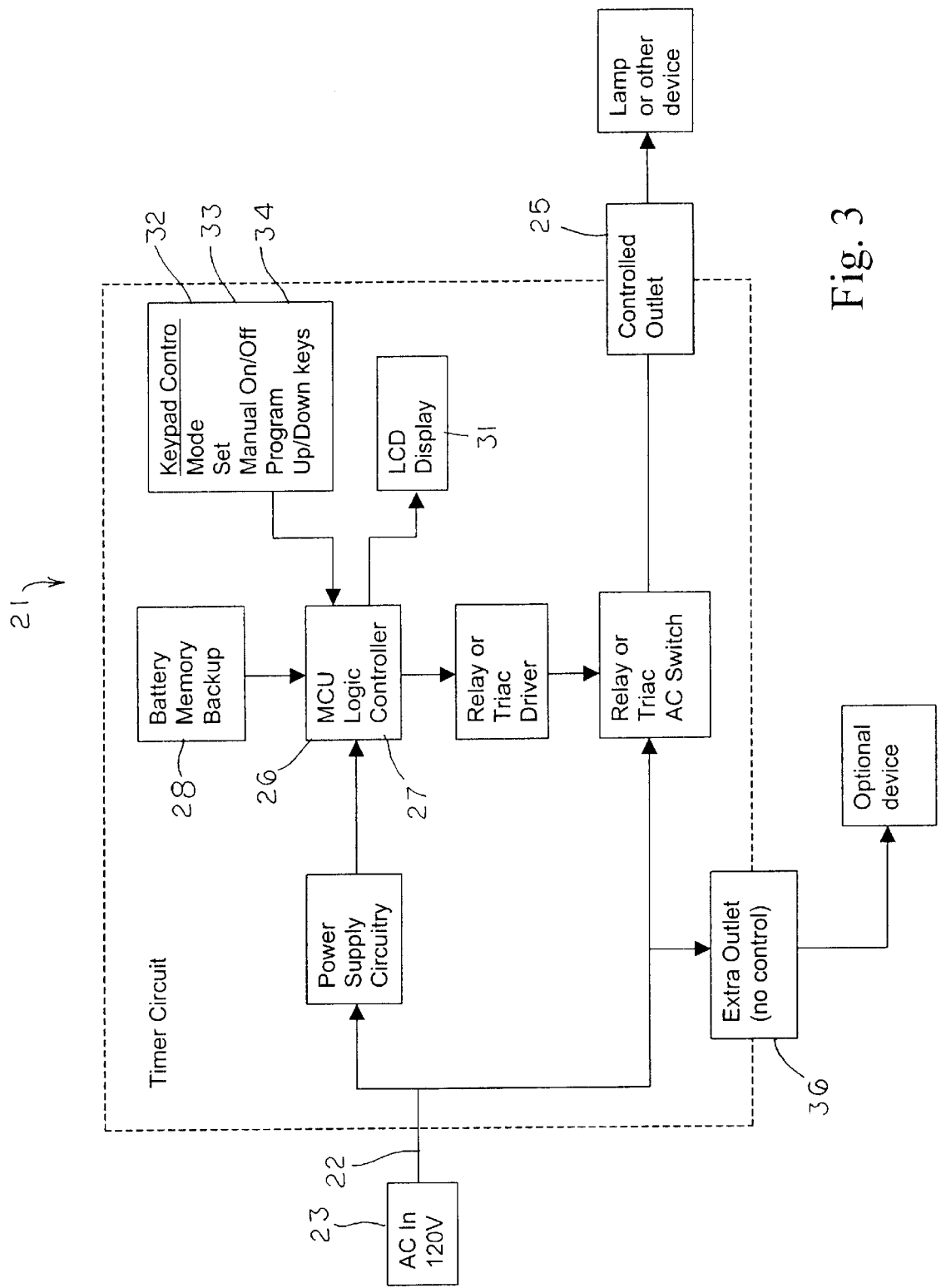
FIG. 3 is a block diagram of the timer of FIG. 1.

The timer 10 also has an electric circuit 21, shown in block diagram form in FIG. 3, which includes a conventional electric power cord 22 terminating at a male plug 23, a female electric plug receptacle 25 positioned to be accessed through the storage chamber 16, and a controller 26 which controls the electric current passing from the power cord 22 to the female receptacle 25.

The controller 26 itself has a microprocessor 27 which typically includes permanent memory such as a read only memory (ROM) for storing the program instructions for operation and control of the timer, and a working memory or random access memory (RAM). The controller 26 also has a battery memory backup 28 for maintaining instructions and data entries in memory, and a control panel 29 coupled to the microprocessor 27. The control panel 29 includes a display panel 31, a function key 32, an up key 33 and an auto/manual key 34. The display panel 31 is a liquid crystal display that shows the current day, current time, and the auto or manual mode of operation.

In use, the operator plugs the male plug 23 of the timer electric power cord 22 into a conventional wall electric receptacle and plugs the lamp male plug LP into the timer female receptacle 25. The lamp-electric cord C is wound and stored within the timer storage chamber 16 with the cord C passing through the slot 18 within the door 17 to minimize the exposure of the lamp cord. The operator then enters the current time and day of the week into the controller memory utilizing the control panel keys as conventionally known in the art as it relates to other programmable devices.

In a preferred form of the invention the timer 10 operates in the same programmed manner during all days of the week. It should be noted however that the present invention may also be programmed to operate in the same manner Monday through Friday and in another programmed manner Saturday and Sunday, or it may be programmed to operate in a different manner each day of the week.

The timer 10 may be operated in either a manual mode wherein the female receptacle 25 is energized regardless of the current time or in an automatic mode wherein the female receptacle 25 is energized according to the pre-selected time setting programmed within the controller 26. With continued reference to the automatic mode of operation, as the current time within the controller reaches a preselected "on" range programmed within the controller, the controller 26 energizes the female receptacle 25 thereby turning on the lamp L position upon the timer. Upon the current time reaching the end of the pre-selected "on" range the controller 26 de-energizes the female receptacle 25, thereby turning off the lamp. The timer 10 continually cycles through the pre-selected programmed entries in this manner until the timer is removed from operation, turned off, or re-programmed.

It should be understood that while the preferred embodiment includes a storage chamber 16 for the lamp cord such a storage chamber is not mandatory. Also, the female receptacle 25 may be positioned upon the side wall 14 of the housing 11 rather than within the storage chamber 16. It should also be understood that the timer may include a second female receptacle 36 which is not controlled by the controller 26 but which is always energized. This second female receptacle 36 may be utilized to power other appliances besides the lamp positioned thereon. It should be understood that as an alternative to the control circuit utilizing a microprocessor other conventionally known mechanical control devices may be utilized to control the power supplied to the lamp in accordance with a programmed time internal, the term programmed not being limited to an association with microprocessors.

It should be understood that the storage chamber 16 may alternatively extend from the bottom wall of the housing with a slot extending to the side wall of the housing.

Also, it thus should be understood that the present invention provides a timer which may be positioned anywhere within a wall room, instead of being limited to a position upon the wall. Furthermore, the timer is easily accessible, provides a manual override to enable the lamp to be utilized outside the pre-selected time interval, and provides a timer which is aesthetically pleasing and not visually noticeable. Lastly, the timer bottom wall may be provided with a soft, resilient cushioning material and as such the timer also prevents the lamp from damaging underlying furniture, a problem which has existed with some lamps are placed directly upon fine furniture.

It thus is seen that a timer is now provided which overcomes problems with those of the prior art. While this invention has been described in detail with particular references to the preferred embodiments thereof, it should be understood that many modifications, additions and deletions, in addition to those expressly recited, may be made thereto without departure from the spirit and scope of the invention as set forth in the following claims.

What is claimed is:

1. A timer to be used with a lamp having an electric cord with a male plug, said timer comprising,
    a housing having a floor, a top wall sized and shaped to receive a lamp thereon, and side wall extending between said floor and said top wall, said housing being adapted to support a lamp positioned upon the top wall, said housing also having internal walls partially defining a separate, externally accessible storage chamber sized and shaped to receive a length of the lamp electric cord,
    an electric cord extending from said housing having a male plug configured to be received in a conventional electric receptacle;
    a female electric receptacle extending into said housing configured to receive the male plug of a lamp; and
    programmable control means for automatically energizing at preselected time intervals said female electric receptacle with an electric current passing through said electric cord.

2. The timer of claim 1 wherein said programmable control means include manual override means to energize said female electric receptacle at times other than the pre-selected time intervals.

3. The timer of claim 1 wherein said housing includes a movable door, whereby access to the interior of said storage chamber is allowed through said door.

4. The timer of claim 1 wherein the female electric receptacle is positioned for access through said storage chamber.

5. The timer of claim 1 further comprising a second female receptacle extending into said housing, said second female receptacle being continuously energized with electric current passing through said electric cord.

6. A timer for use with a conventional lamp having an elongated electric cord terminating with a male electric plug, the timer comprising,
    a housing sized and shaped to support a conventional lamp thereon, said housing also having internal walls partially defining a separate, externally accessible internal storage chamber, said storage chamber being sized and shaped to received a length of the lamp electric cord;
    an electric cord extending from said housing having a male plug configured to be received in a conventional electric receptacle;
    a female electric receptacle coupled to said housing configured to receive the male electric plug of a lamp; and
    programmable control means for automatically energizing at preselected time intervals said female electric receptacle with an electric current passing through said electric cord.

7. The timer of claim 6 wherein said programmable control means include manual override means to energize said female electric receptacle at times other than the pre-selected time intervals.

8. The timer of claim 6 wherein said housing includes a movable door, whereby access to the interior of said storage chamber is allowed through the door.

9. The timer of claim 6 wherein the female electric receptacle is positioned for access through said storage chamber.

10. The timer of claim 6 further comprising a second female receptacle extending into said housing, said second female receptacle being continuously energized with electric current passing through said electric cord.

11. A timer to be used with a lamp having an electric cord with a male plug, said timer comprising,
    a housing having a floor, a top wall and side wall extending between said floor and said top wall, said top wall including a central portion and a peripheral lip extending upwardly from said central portion,
    an electric cord extending from said housing having a male plug configured to be received in a conventional electric receptacle;
    a female electric receptacle extending into said housing configured to receive the male plug of a lamp; and
    programmable control means for automatically energizing at preselected time intervals said female electric receptacle with an electric current passing through said electric cord.

12. The timer of claim 11 wherein said housing defines an internal storage chamber therein sized and shaped to receive a length of the lamp electric cord.

13. The timer of claim 12 wherein said housing includes a movable door, whereby access to the interior of said storage chamber is allowed through said door.

* * * * *